United States Patent
Peace et al.

(10) Patent No.: US 10,788,343 B2
(45) Date of Patent: Sep. 29, 2020

(54) FLOW METER SYSTEMS AND METHODS PROVIDING CONFIGURABLE FUNCTIONALITY

(71) Applicant: Sensus Spectrum LLC, Raleigh, NC (US)

(72) Inventors: Daniel W. Peace, Punxsutawney, PA (US); Michael S. McCracken, Grampian, PA (US)

(73) Assignee: Sensus Spectrum LLC, Raleigh, NC (US)

( * ) Notice: Subject to any disclaimer, the term of this patent is extended or adjusted under 35 U.S.C. 154(b) by 59 days.

(21) Appl. No.: 16/273,646

(22) Filed: Feb. 12, 2019

(65) Prior Publication Data

US 2020/0256711 A1    Aug. 13, 2020

(51) Int. Cl.
*G01F 1/12* (2006.01)
*G01F 25/00* (2006.01)

(52) U.S. Cl.
CPC ............ *G01F 1/12* (2013.01); *G01F 25/0007* (2013.01)

(58) Field of Classification Search
CPC ....................................................... G01F 1/12
See application file for complete search history.

(56) References Cited

U.S. PATENT DOCUMENTS

| | | | |
|---|---|---|---|
| 4,286,471 A | 9/1981 | Lee et al. | |
| 4,305,281 A | 12/1981 | Lee et al. | |
| 4,534,226 A * | 8/1985 | Rose | G01F 1/115 73/861.02 |
| 5,325,729 A * | 7/1994 | Goodson | G01F 1/10 73/861.91 |
| 5,473,932 A * | 12/1995 | Fitzpatrick | G01F 1/10 73/1.28 |
| 5,509,305 A * | 4/1996 | Husain | G01F 1/10 73/195 |
| 5,654,513 A * | 8/1997 | Bremer | G01F 1/10 73/861.83 |
| 5,877,430 A * | 3/1999 | Peace | G01F 1/10 73/861.82 |
| 6,453,757 B1 | 9/2002 | Montag et al. | |
| 8,516,901 B2 * | 8/2013 | Kroemer | G01F 1/667 73/861.25 |
| 9,671,270 B2 * | 6/2017 | Grewal | G01F 1/662 |
| 10,514,286 B2 * | 12/2019 | Morihana | G01F 15/18 |

\* cited by examiner

*Primary Examiner* — Jewel V Dowtin
(74) *Attorney, Agent, or Firm* — Andrus Intellectual Property Law, LLP

(57) ABSTRACT

A flow meter system for detecting the flow of a fluid between an inlet and an outlet. A top plate is coupled to the inlet and the outlet and a sensor is configured to detect the fluid flowing therebetween. A main module is coupled between the inlet and the outlet and has a main rotor configured to be rotated by the fluid flowing through the main module. An output shaft is coupled to the main rotor such that rotation of the main rotor causes rotation of the output shaft. A first spacer is removably coupled between the main module and the outlet. The first spacer is rotorless. The top plate defines an opening that receives the output shaft. The first spacer ensures alignment between the output shaft and the opening defined in the top plate. The sensor senses rotation of the output shaft to detect the flow of fluid.

20 Claims, 9 Drawing Sheets

FLOW METER SYSTEMS AND METHODS PROVIDING CONFIGURABLE FUNCTIONALITY

FIELD

The present disclosure generally relates to flow meter systems, and more particularly to flow meter systems providing configurability of components to upgrade functionality.

BACKGROUND

The Background and Summary are provided to introduce a foundation and selection of concepts that are further described below in the Detailed Description. The Background and Summary are not intended to identify key or essential features of the claimed subject matter, nor are they intended to be used as an aid in limiting the scope of the claimed subject matter.

The following U.S. Patents and Patent Applications are incorporated herein by reference:

U.S. Pat. No. 5,877,430 discloses a turbine gas flow meter that includes a meter body including an inlet portion having an inlet body mounted therein. An exit end of the body inlet portion is defined at an internal plenum of the meter body. A removable turbine meter measuring module including a rotor assembly is inserted into the plenum with an inlet end of the rotor assembly and the exit end of the body inlet portion defining an interface therebetween. A closed space is formed about the rotor assembly within the plenum between an inner wall of the body and outer walls of the rotor assembly. An axial gap between a surface of the rotor assembly inlet end and a surface of the body inlet portion exit end, and/or radial notches in either of the surfaces, provide fluid pressure communication from the interface to the closed space. A pressure tap extends through the body into the closed space for measuring pressure within the closed space.

U.S. Pat. No. 6,453,757 discloses an ultrasonic gas meter housing member configured to provide an associated multi-configuration ultrasonic gas meter assembly. The housing member is installable in an ultrasonic gas flow meter that includes an internal flow measurement tube along which gas travels for flow measurement, the tube having an inlet end and an outlet end. The ultrasonic gas meter housing member includes a closed back portion and a front portion spaced from the back portion to define a space for receiving the internal flow measurement tube such that the tube extends across the internal space of the housing member. At least one wall portion extends between the back portion and the front portion, the wall portion having a first opening and a second opening therethrough for connection of the housing member to a gas inlet pipe and a gas outlet pipe. The gas meter housing member is symmetrical about a plane which divides the housing member into a first portion and a second portion. The symmetrical configuration enables the housing member to receive the flow measurement tube in both a first orientation in which the first and second opening face in a first direction and the inlet end of the flow measurement tube is positioned in the first portion of the housing member and the outlet end is positioned in the second portion, and a second orientation in which the first and second opening face in a second direction substantially perpendicular to the first direction and the inlet end of the flow measurement tube is positioned in the second portion of the gas meter housing member and the outlet end is positioned in the first portion. The first and second orientations are particularly useful in enabling the housing member to be used both in gas meter installation sites where the gas pipes extend downward, and in gas meter installation sites where the gas pipes extend upward.

SUMMARY

One embodiment of the present disclosure generally relates to a flow meter system for detecting the flow of a gas between an inlet and an outlet defining an internal space therebetween. A top plate is configured to be coupled to the inlet and the outlet, and a sensor is configured to detect the fluid flowing between the inlet and the outlet. The flow meter system includes a main module configured to be coupled between the inlet and the outlet and to communicate the gas therebetween. The main module includes a main rotor configured to be rotated by the fluid flowing through the main module. An output shaft is configured to be coupled to the main rotor such that rotation of the main rotor causes rotation of the output shaft. A first spacer is configured to be removably coupled between the main module and the outlet and to communicate gas therebetween. The first spacer is rotorless. The top plate defines an opening configured to receive the output shaft from the main module. The first spacer is configured to ensure alignment between the output shaft and the opening defined in the top plate. The sensor senses rotation of the output shaft to detect the flow of gas.

Another embodiment generally relates to a method of converting a flow meter system from a first type having a first main module to a second type having a second main module, where each of the first main module and the second main module is configured to communicate gas between an inlet and an outlet, and each is configured to detect the flow of a gas therebetween. The top plate is coupled between the inlet and outlet. The method includes uncoupling the top plate, where when configured as the first type a short end of the top plate is closer than a long end to the outlet. The method includes removing the first main module from the flow meter system, where the first main module includes a rotor configured to be rotated by the fluid flowing through the first main module. The method includes coupling a first spacer and a second spacer between the inlet and the outlet, where the first spacer and the second spacer are each separate and rotorless. The method includes coupling the second main module between the first spacer and the second spacer, where the second main module includes a rotor configured to be rotated by the fluid flowing through the second main module. The method includes rotating and coupling the top plate to the inlet and the outlet such that the long end of the top plate is closer than the short end to the outlet.

Another embodiment generally relates to a method of converting a flow meter system from a first type having a first main module to a second type having a second main module, each of the first main module and the second main module being configured to communicate a gas between an inlet and an outlet and each having a rotor configured to be rotated by the flow of the fluid and to consequently rotate an output shaft. The method includes removing a first top plate coupled to the inlet and the outlet, where the first top plate has a short end and a long end and defines an opening for receiving the output shaft, and where the short end is closer than the long end to the outlet. The method includes removing the first main module from the flow meter system and removing a first spacer and a second spacer each coupled between the inlet and the outlet. The first spacer and the second spacer are each rotorless. The method includes coupling the second main module between the inlet and the output, where the second main module is different than the first main module. The method includes coupling a second top plate to the inlet and the outlet, where the second top plate has a short end and a long end and defines an opening for receiving the output shaft, and where the second top plate is coupled such that the output shaft of the second main module aligns with the opening.

Various other features, objects and advantages of the disclosure will be made apparent from the following description taken together with the drawings.

BRIEF DESCRIPTION OF THE DRAWINGS

The drawings illustrate the best mode presently contemplated of carrying out the disclosure. The same numbers are used throughout the drawings to reference like features and like components. In the drawings.

DETAILED DISCLOSURE

Figure 1:
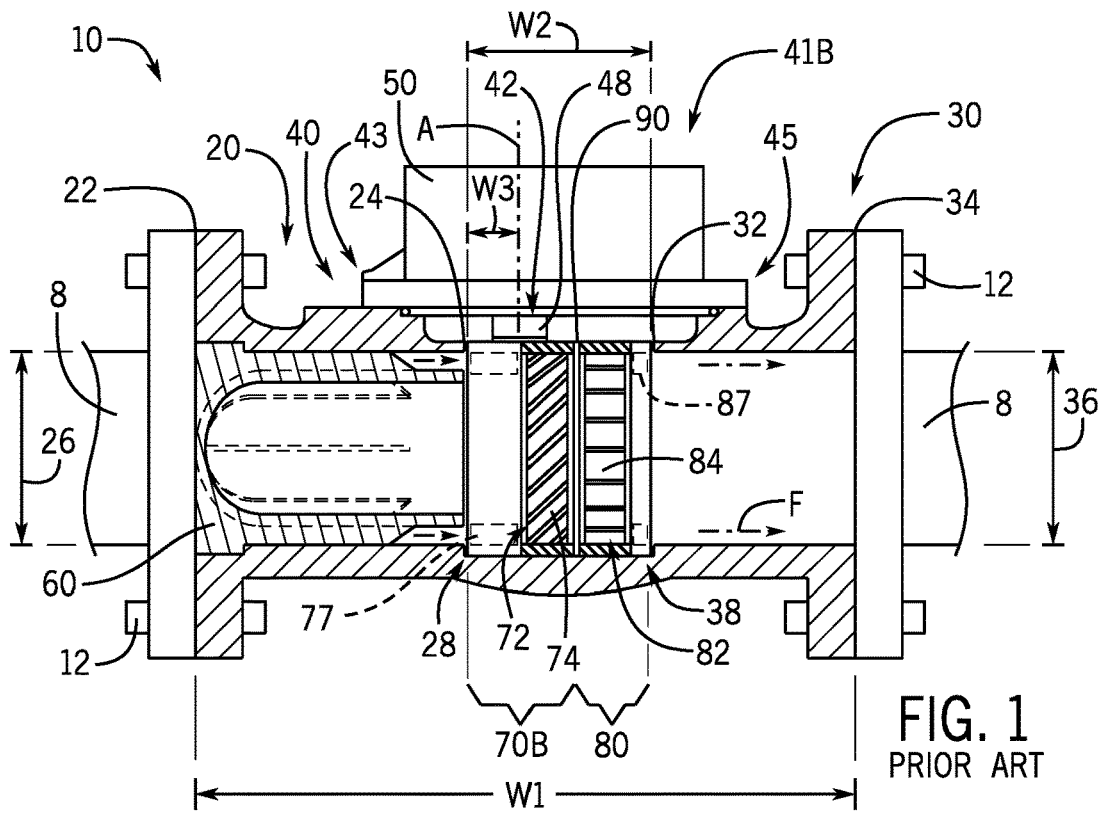
FIGS. 1 and 2 are sectional side views of flow meter systems presently known in the art.

This written description uses examples to disclose embodiments of the present application, including the best mode, and also to enable any person skilled in the art to practice or make and use the same. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Flow meters are devices commonly installed at residential, commercial, or industrial buildings to measure the consumption of fluid, such as natural gas provided by a utility. Existing flow meters provided by Sensus Spectrum LLC include both single rotor and dual rotor models, including the commercially available turbine meter "MKII" and the automatically adjusting "AAT," respectively. These flow meters are presently available in four, six, eight, and twelve inch sizes and with pressure rated bodies and top plates of 175, 220, 270, 750, and 1500 PSIG operation and flange classes. Different models are also available for differing flow capacities, including a "standard" model with a 45 degree rotor blade angle and a "high" capacity 30 degree rotor blade angle.

The single rotor MKII design originated in the 1970s, whereas the dual rotor AAT later design was developed to fit into existing MKII bodies, using new top plates and internal components. The AAT models offer advanced features beyond those provided with the MKII design. However, both models continue to be extensively used in the field. As a result, the different pressure rating, flange size, and flow capacity offerings available across these product lines requires production and inventory for a large number of distinct top plates, main rotors, module carriers, and bearing brackets to continue to support both product lines and all variations therein. The present inventors have further identified that the lack of interchangeability of components in existing systems, other than reusing a common body, results in increased cost and complexity for a user to upgrade from an MKII model to an AAT model to obtain this increased functionality.

Accordingly, the present inventors have developed the presently disclosed systems and methods for reducing production and inventory costs by providing interchangeability of components for flow meter systems to provide different functionality. Additionally, the presently disclosed systems and methods further decrease the financial barrier for users wishing to upgrade in the future. The present disclosure outlines a newly-designed single rotor AT model "Advanced Turbo," which provides a new production alternative to existing single rotor MKII models. The AT model includes components of the AAT model and therefore most of the features, except for automatic adjusting. Among other changes, a new spacer of the AT takes the place of the secondary rotor module of an AAT model. As will be discussed later, upgrade paths include that from an existing MKII device to a new MKIII device as presently disclosed, as well as paths from a new AT or from a new MKIII to the full AAT capability. In certain embodiments, which are discussed further below, the new single rotor MKIII model uses the existing MKII top plate, in a reversed position, plus two new spacers, as well as components of the AAT. This realizes some of the features, except for automatic adjusting. This embodiment enables the upgrading an AT model to full AAT capability by replacing the spacer with a secondary rotor module. Similarly, the presently disclosed embodiments enable upgrading a MKIII to full AAT capability by replacing the MKII top plate with that of an AAT model, with both spacers being replaced with a secondary rotor module. Any of these future upgrade steps provide various considerations for economical choices by the end user.

The presently disclosed systems and methods are applicable to flow meter systems of all sizes, pressure ratings, and flow capacities. Therefore, the present disclosure will generally refer to sizing, pressure rating, and flow capacity generically. Moreover, it should be recognized that the presently disclosed systems and methods are also applicable to other sizes, pressure ratings, and flow capacities not previously discussed or presently offered. For example, this includes different pitches for one or more rotors in the one or more modules contained within a given flow meter system.

Similarly, the presently disclosed systems and methods are generally disclosed as relating to a system in which an output shaft is rotated by a rotor to be sensed by a sensor within the top plate. In other words, a sensor detects the mechanical rotation of an output shaft to detect the flow of fluid. However, the particular sensors and mechanisms for detecting rotation of the rotor (or rotors), or other techniques for detecting fluid flow, are not limited by the present disclosure.

Figure 2:
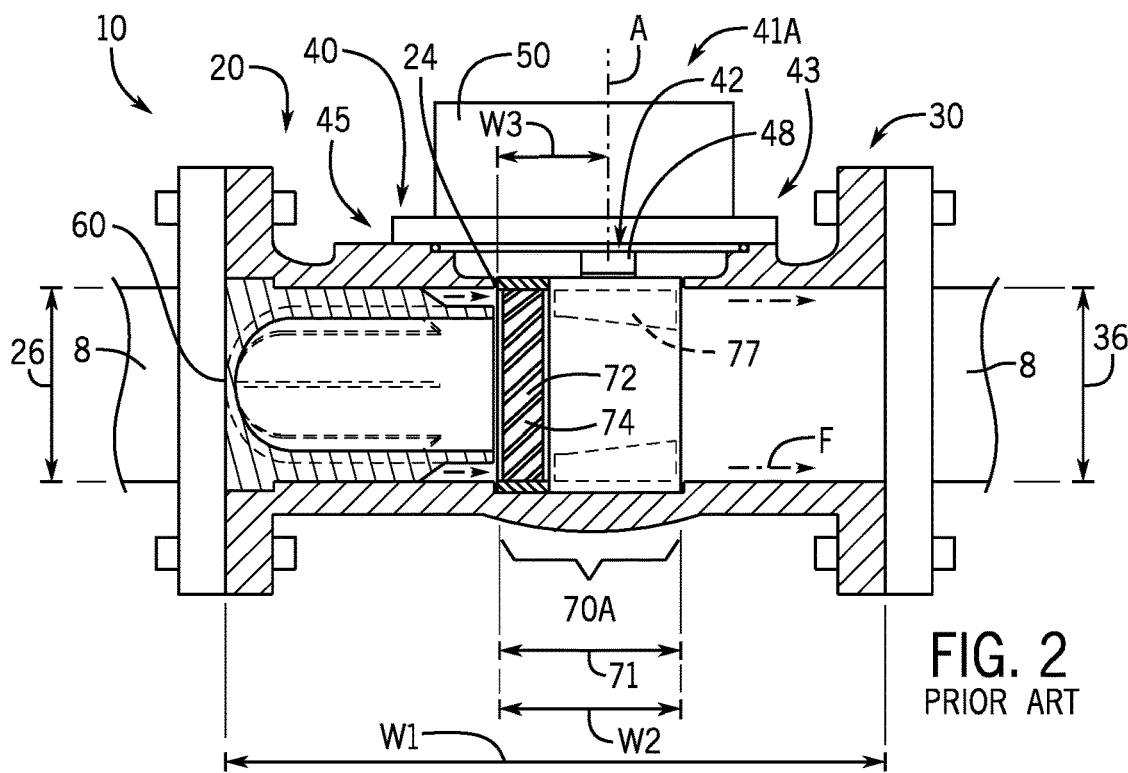

FIGS. 1 and 2 depict flow meter systems presently known in the art, specifically an AAT model and an MKII model, respectively. As shown, each flow meter system 10 is installable at the inlet 20 and outlet 30 between corresponding portions of a flow pipe 8. The flow meter system 10 is configured to detect the flow of fluid between the inlet 20 and the outlet 30 in the customary manner. The inlet 20 and the outlet 30 are separated by a total width W1, which in the present example is consistent across the flow meters presently known in the art and those disclosed herein, which vary depending upon body size and pressure rating. The inlet 20 has an upstream end 22 and a downstream end 24 with an inlet diameter 26, and the outlet 30 has an upstream end 32 and a downstream end 34 and an outlet diameter 36. An internal space W2 is defined between the downstream end 24 of the inlet 20 and the upstream end 32 of the outlet 30, which also remains unchanged between flow meters presently known in the art and the systems and methods presently disclosed, depending upon body size.

By way of example, the internal spaces W2 for both AAT and MKII flow meter systems 10 of four, six, eight, and twelve diameters are nominally 4.000, 5.002, 5.125, and 7.257 inches respectively. In certain embodiments, retention lips 28 and 38 defined within the inlet 20 and outlet 30 ensure proper alignment and orientation of components coupled thereto. Moreover, these features prevent interference between installed components and others within the inlet 20 and/or outlet 30, such as the nose cone 60 within the inlet 20 in existing AAT and MKII models.

In certain embodiments, the inlet diameter 26 of the inlet 20 is equal to the outlet diameter 36 of the outlet 30. Likewise, certain embodiments are configured such that all components installed between the inlet 20 and the outlet 30 have this same diameter, and/or define openings such that the flow F of fluid is minimally diverted or resisted therebetween.

A top plate 40, (such as 41A for MKII or 41B for AAT), is configured to be coupled to the inlet 20 and the outlet 30 with an incorporated sensor 50 that is configured to detect the fluid flowing between the inlet 20 and the outlet 30. One of a type-A main module 70A for a first type of flow meter system 10 (such as is used in the MKII model), or a type-B main module 70B for a second type of flow meter system 10 (such as is used in the AAT model), is configured to be coupled between the inlet 20 and the outlet 30 and to communicate the fluid therebetween. The type-A main module 70A or type-B main module 70B includes a main rotor 72 that is rotated by the fluid flowing therethrough. Additional information relating to the type-A main module 70A and type-B main module 70B, and other flow meter systems of this nature, is also provided in U.S. Pat. No. 5,877,430, which is incorporated by reference herein. It should be recognized that while the present disclosure principally refers to two types of main modules (type-A and type-B), different modules for type-A and/or type-B are anticipated, provided that type-A and type-B are distinguishable from each other. It should be further recognized that references to a "first" or "second" main module may refer to either the type-A module or the type-B module and is generally used as an indicator of the order in which the modules are installed in a given section of pipe. The same references may also be made to spacers (discussed below), whereby ordinal references will in most cases indicate the order of installation rather than a fixed type of spacer.

An output shaft 48 is coupled to the main rotor 72, either directly or indirectly, such that rotation of the main rotor 72 causes rotation of the output shaft 48. The output shaft extends through an opening 78 in the respective module, type-A main module 70A or type-B main module 70B (see FIG. 11). The top plate 40 defines an opening 42 that is positioned and configured to receive the output shaft 48 such that the sensor 50 can sense the rotation of the output shaft 48 to detect the flow of fluid in the customary manner.

Among the primary distinctions between the flow meter systems of FIG. 1 and FIG. 2 is the presence of a secondary module 80 incorporating a second rotor 82 for the device shown in FIG. 1. A center plate 90 is coupled between the type-B main module 70B and the secondary module 80 to provide proper alignment and separation therebetween. This same center plate 90 is configured to function in the embodiments shown in FIGS. 1, 3-4, and 6-9. Generally, the type-A main module 70A or type-B main module 70B, also referred to as measuring modules, contain main rotor 72 which respond to the flow and cause rotation of the output shaft 48 as previously discussed such that the sensor 50 can detect the flow passing between the inlet 20 and the outlet 30.

When present, a secondary module 80, also referred to as a sensing module, increases the accuracy of the flow meter system 10 by providing automatic adjusting and self-checking features. In some embodiments, the output of the sensing module is linked with constant remote accuracy monitoring capabilities and in-line field diagnostics. Specifically, the main rotor 72 has a pitch 74, and the secondary rotor 82 has a pitch 84, which in the present case is different than the pitch 74. This results in the respective main rotor 72 and secondary rotor 82 rotating at different rates within the same flow of fluid. The ratio of these different rates serves as a means for checking the accuracy of the type-B main module 70B, since the type-B main module 70B and secondary module 80 should have a consistently, known relationship of ratio over a wide range of rates of flow. The embodiment of FIG. 2 does not include a secondary module 80, thus lacking at least this checking means for monitoring the accuracy of a main rotor 72.

As shown in FIGS. 1-8 and 11, the type-A main module 70A and type-B main module 70B have widths 71, diameters 73, and annular exteriors 75. A center 76 supported by ribs 79 is coupled to the annular exterior 75 define a plurality of exterior openings 77 therein (see FIG. 11). The exterior openings 77 permit the fluid to flow from the inlet 20 to the outlet 30 through the type-A main module 70A or type-B main module 70B, thereby rotating the main rotor 72 positioned therein. Exterior openings in spacers, such as exterior opening 126 in the second spacer 120 defined by the annual exterior 125 (see FIGS. 6 and 10) align with these exterior openings 77, which are discussed below. Similarly, the secondary module 80, when present as in FIGS. 1 & 4, has a width 81, and diameter 83. Similarly to the type-A main module 70A and type-B main module 70B, the secondary module 80 has a center supported by ribs coupled to the annular exterior to define a plurality of external openings therein (not separately shown). These exterior openings 87 permit flow of the fluid from the inlet 20 to the outlet 30 through the secondary module 80, thereby rotating the secondary rotor 82.

The devices shown in FIGS. 1 and 2 are further distinguished in the specific type of top plate 40 used: a first top plate 41A or a second top plate 41B. Each top plate 40 can be described as having a short end 43 and a long end 45 that is opposite the short end 43, whereby the short end 43 is closer than the long end 45 to the opening 42 defined within the top plate 40. Further, an alignment width W3 is defined between the downstream end 24 of the inlet 20 and a shaft axis A defined within the center of the opening 42. Likewise, width W4 is defined between the shaft axis A and the upstream end 32 of the outlet 30 (see FIGS. 5 and 6). In this manner, the alignment width W3 is smaller for the flow meter system 10 shown in FIG. 1 than that shown in FIG. 2. This is the case because the flow meter system 10 of FIG. 2 has a first top plate 41A with its short end 43 downstream of its long end 45, in contrast to that of FIG. 1.

Figure 3:
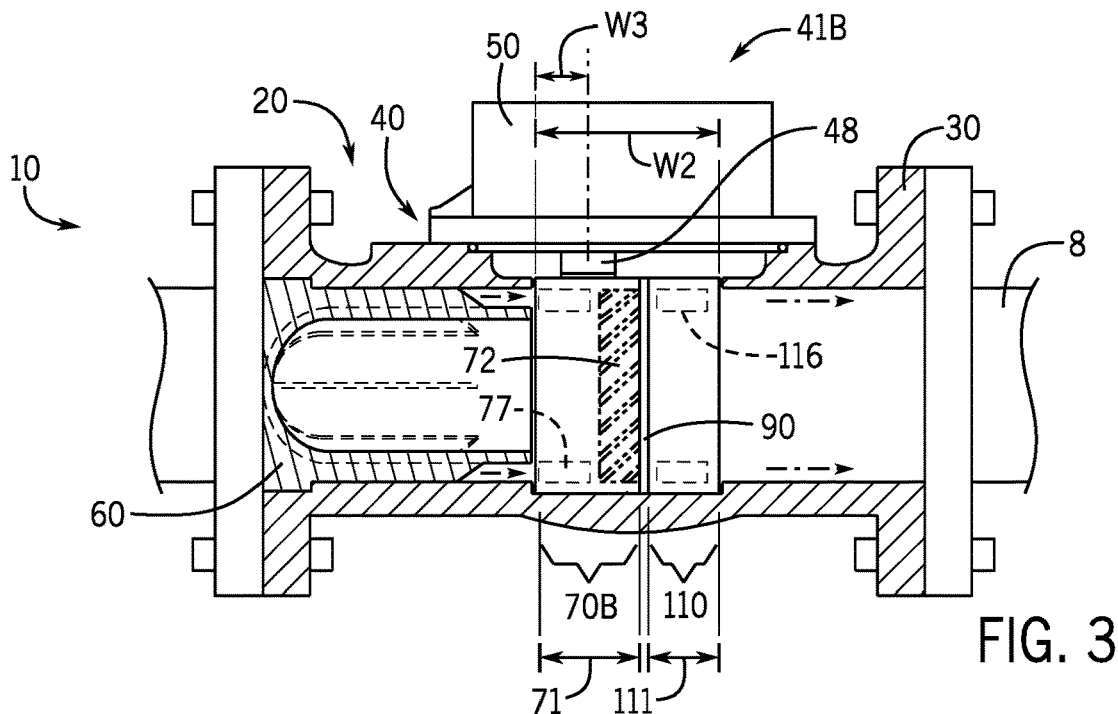
FIG. 3 is a sectional side view of one embodiment of a flow meter according to the present disclosure.
Figure 13:
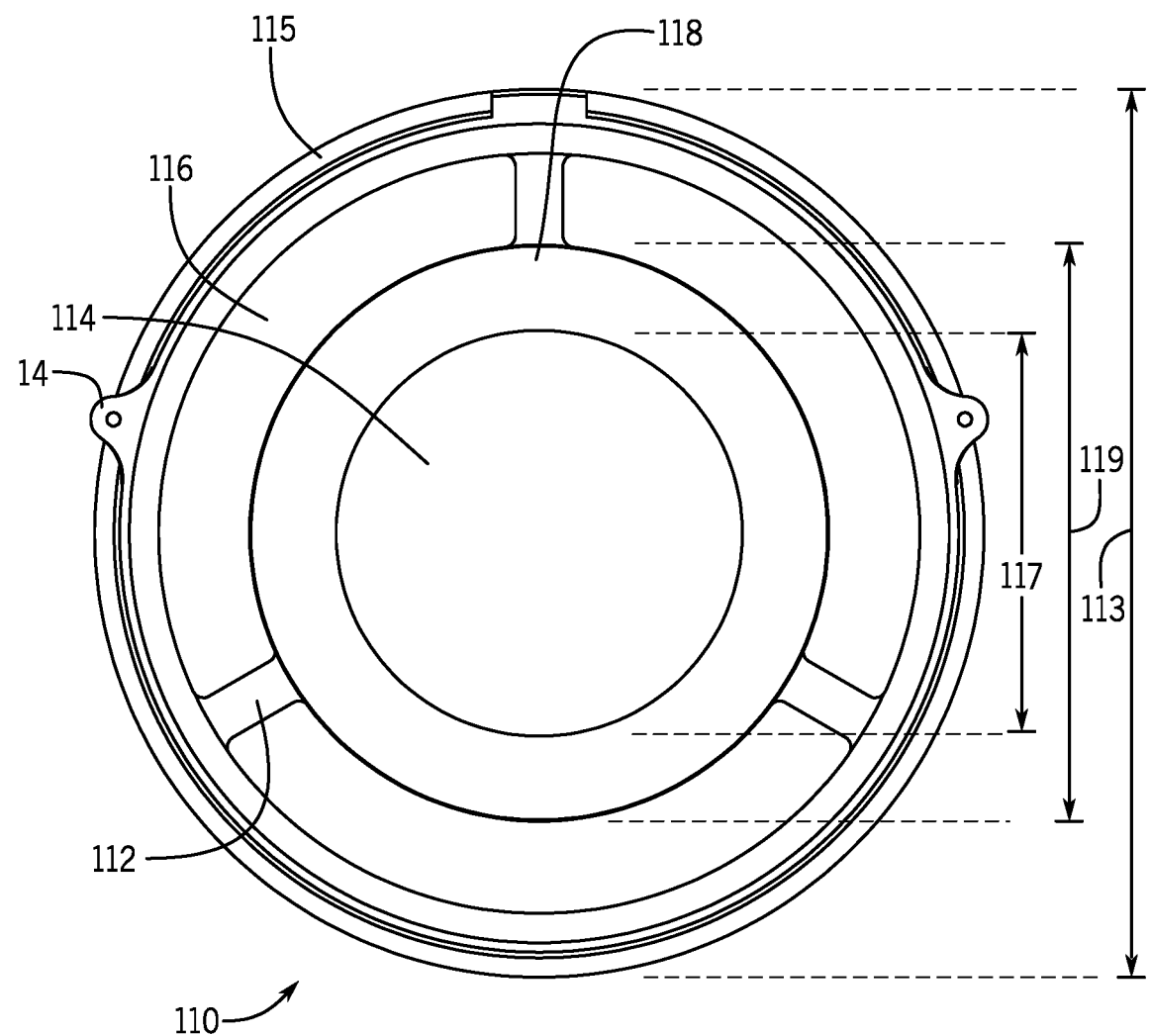

FIG. 3 shows one embodiment of a flow meter system 10 according to the present disclosure that provides for easy configuration or upgradability of components and corresponding functions. In particular, the flow meter system 10 of FIG. 3 is a single rotor system having a type-B main module 70B, but in place of a secondary module 80 has a first spacer 110 that is rotorless and has a width 111. The first spacer has an annual exterior 115 (see FIG. 9). As is also shown in FIG. 13, the first spacer 110 has a diameter 113, and an annular exterior 115. A center hub opening 114 is defined within the solid hub 118 is coupled to the annular exterior 115 by ribs 112, wherein the solid hub 118 has a diameter 119 and the center hub opening 114 has a diameter 117. As with the type-B main module 70B, a plurality of external openings 116 is defined within the first spacer 110 to permit fluid to flow therethrough. By incorporating the first spacer 110, the flow meter system 10 can be upgraded to include a secondary module 80 while still reusing the same second top plate 41B, saving time and expense for upgrading.

Figure 4:
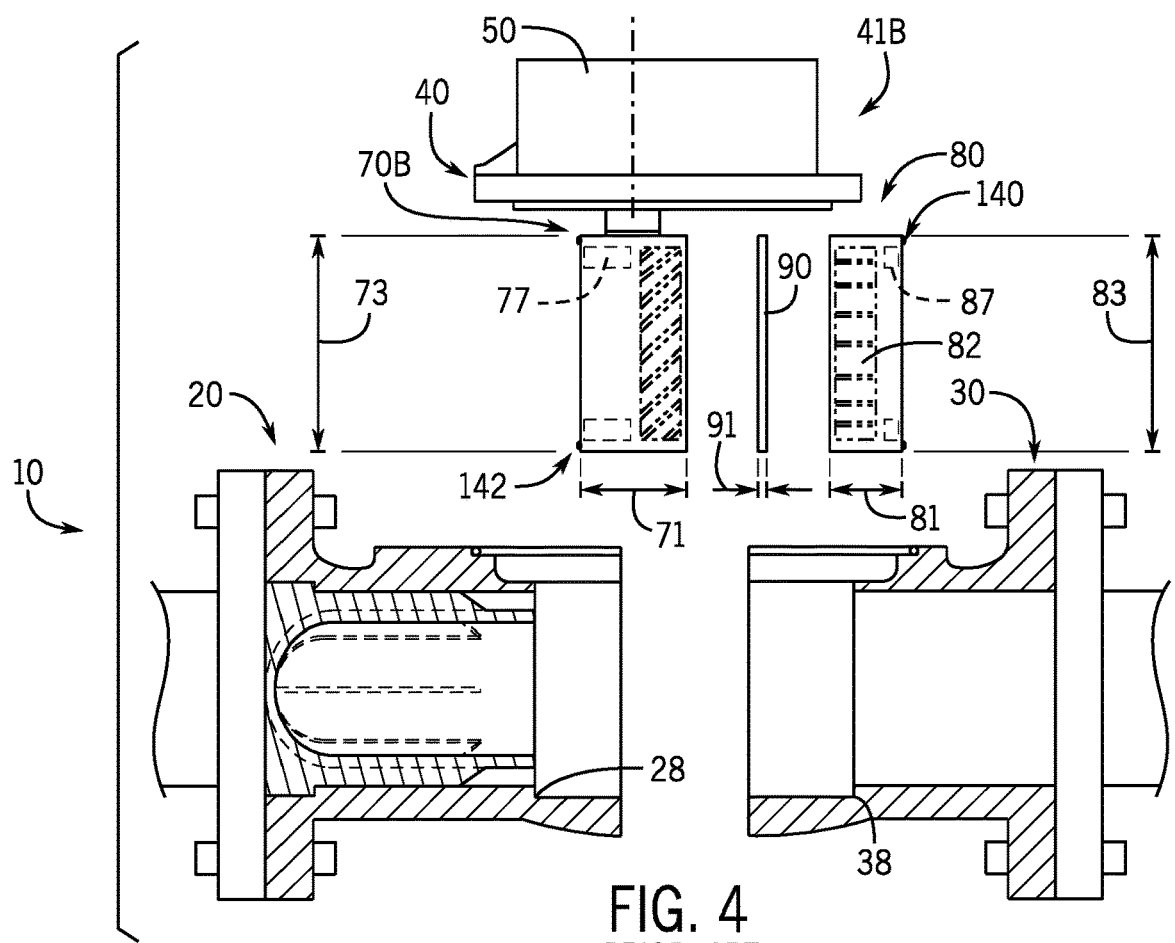
FIG. 4 is an exploded side view of a flow meter substantially similar to that shown in FIG. 1 being upgraded or reconfigured from the device of FIG. 3 according to the present disclosure.
Figure 12:
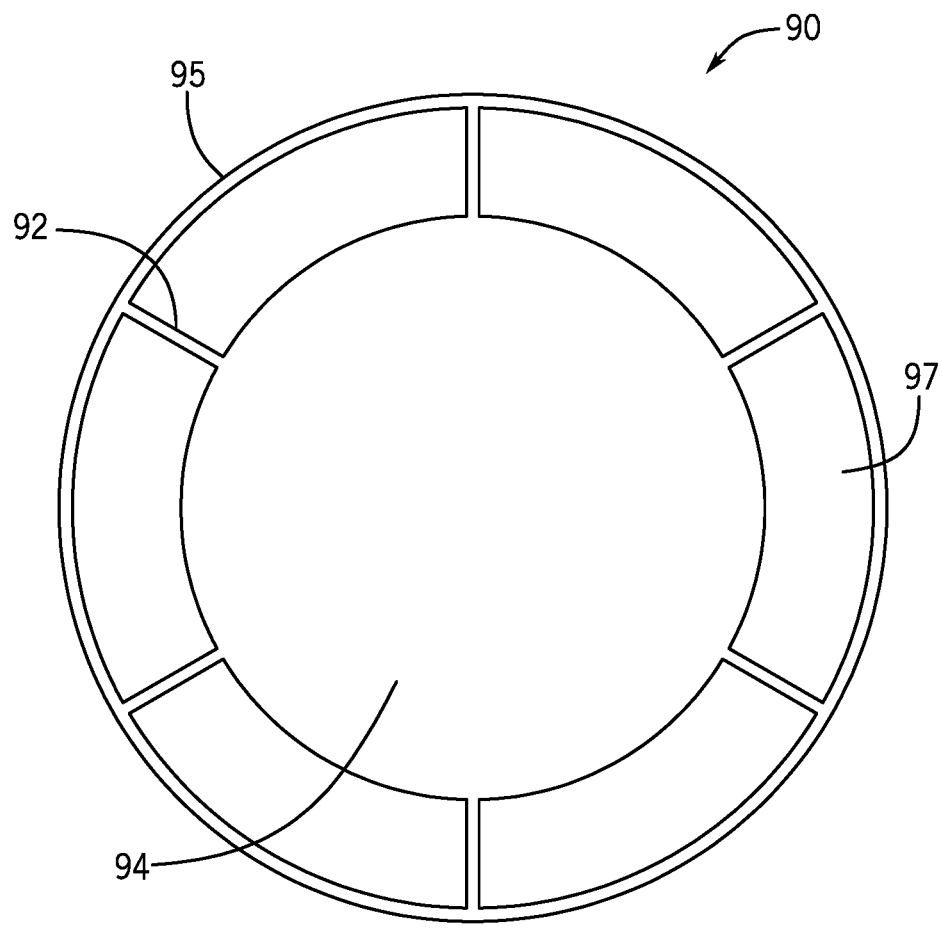
FIGS. 12 and 13 are front views of an exemplary center plate and another spacer from FIG. 9, respectively.

As shown in the exploded view of FIG. 4, the flow meter system 10 from FIG. 3 may be upgraded (in this case from a newly disclosed "AT" model to an AAT model) by removing the top plate 40 and the first spacer 110, and instead coupling a secondary module 80 and the existing type-B main module 70B with the center plate 90 therebetween. As is also shown in FIG. 12, a plurality of exterior openings 97 are defined by the center plate 90 between an annual exterior 95 and a center 94 coupled thereto by ribs 92. These exterior openings 97 allow flow through the center plate 90. The flow meter system 10 is configured such that the width 111 of the first spacer 110 allows this replacement with the secondary module 80. In certain embodiments, the width 111 of the first spacer 110 is the same as the width 81 of the secondary module 80. However, in other embodiments it is the sum total width of respective installed components is equal for the system shown in FIG. 3 and the upgraded system shown in FIG. 4.

By way of example, AAT models at the four, six, eight, and twelve inch diameter sizes have nominal widths 71 of 2.301, 2.839, 2.838, and 4.020 with respective secondary module 80 widths 81 of 1.493, 1.828, 1.954, and 2.868 and respective center plate 90 widths 91 of 0.184, 0.311, 0.311, and 0.347. Additional widths of seals and ball plungers include maximums of 0.007, 0.007, 0.007, and 0.008, respectively. Similarly, present MKII models have type-A main modules 70A for the four, six, eight, and twelve inch diameters having nominal widths 71 of 3.985, 4.985, 5.110, and 7.243 inches. In this manner, the respective components, along with the tolerances of each, fit within the internal spaces W2 previously provided.

Figure 5:
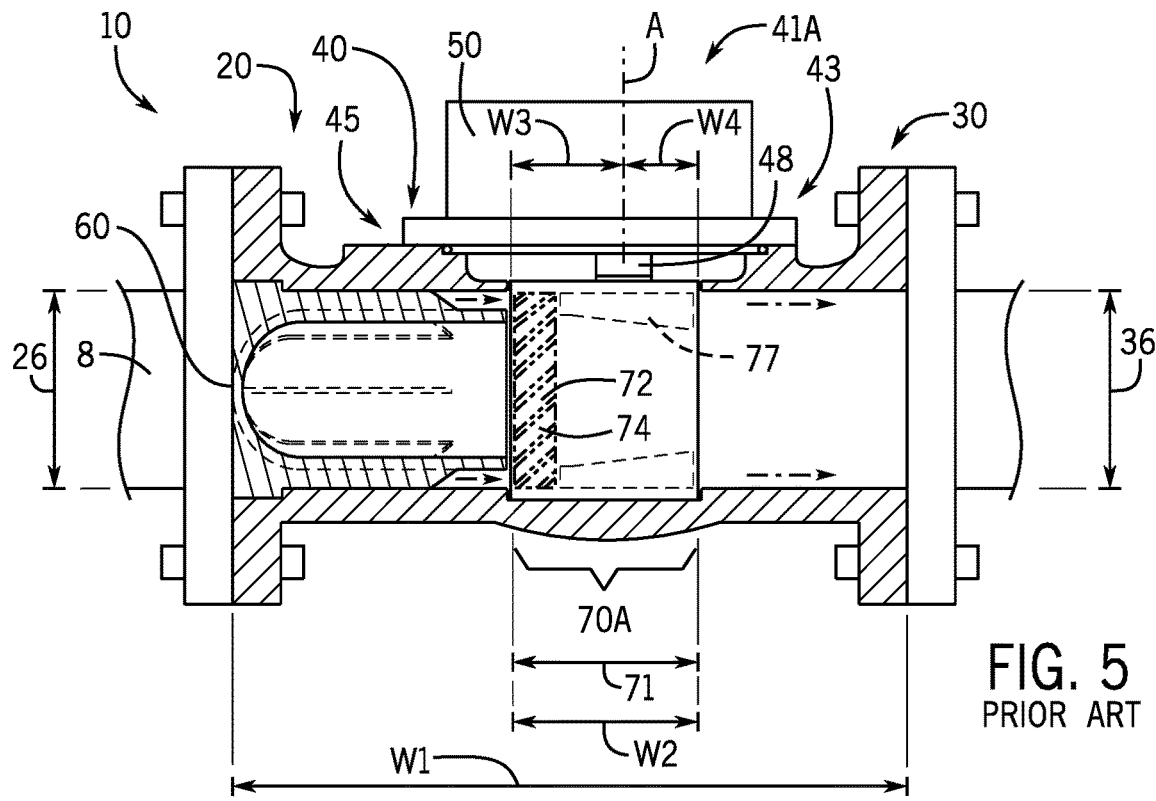
FIG. 5 depicts a side view of a flow meter similar to that shown in FIG. 2.
Figure 6:
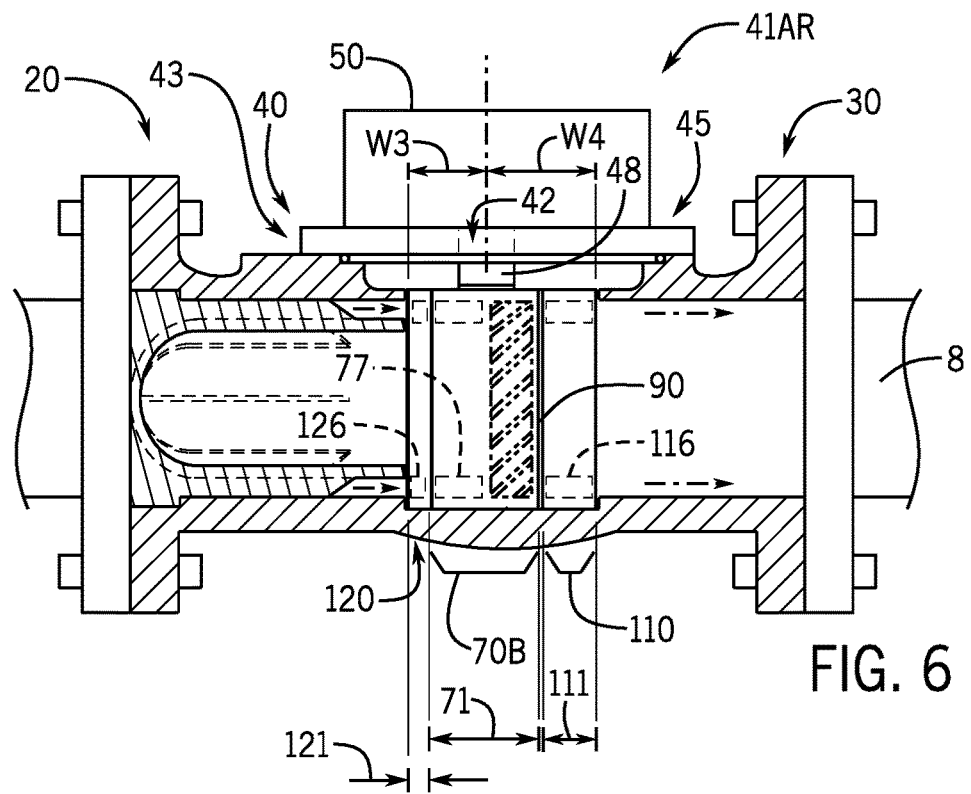
FIG. 6 depicts a side view of one embodiment of a flow meter after being upgraded or reconfigured from the embodiment of FIG. 5 according to the present disclosure.

Similarly, FIGS. 5 and 6 depict the ability to upgrade from a present flow meter system 10, such as that shown in FIG. 2, (see FIG. 5) to one embodiment of a new flow meter system 10 presently disclosed (also referred to as an "MKIII" model, see FIG. 6). In the present case, the type-A main module 70A is removed from the flow meter system 10 shown in FIG. 5 after removing the top plate 40, which in the present case is a first top plate 41A. In the present embodiment, the type-A main module 70A is of the same type used in the embodiment shown in FIG. 2, such as the MKII device presently deployed in the field.

As can be seen in FIG. 6, the type-A main module 70A is replaced with a type-B main module 70B, which resembles the type-B main module 70B of the embodiment shown in FIG. 1, such as used by the AAT models presently deployed in the field. This upgrade alone from a type-A main module 70A to a type-B main module 70B provides improved functionality between the flow meter system 10 shown in FIG. 5 and that shown in FIG. 6, keeping the existing field top plate 41A. However, this configuration also disturbs the alignment between the top plate 40 and the output shaft 48 from that shown in FIG. 5. Accordingly, the present inventors have developed the presently disclosed flow meter system 10 to easily and cost effectively restore such alignment. Specifically, by incorporating the first spacer 110 downstream of the type-B main module 70B, along with the addition of a second spacer 120 upstream of the type-B main module 70B, the top plate 40 shown in FIG. 5 (depicted in that configuration as first top plate 41A) can be rotated 180 degrees (now designated as reversed, first top plate 41AR) such that the output shaft 48 is once again in alignment with the opening 42 defined in the top plate 40. In other words, the same top plate 40 may be used between the embodiments of FIGS. 5 and 6, requiring only the addition of the first spacer 110 and second spacer 120 to upgrade from type-A main module 70A to type-B main module 70B.

Figure 10:
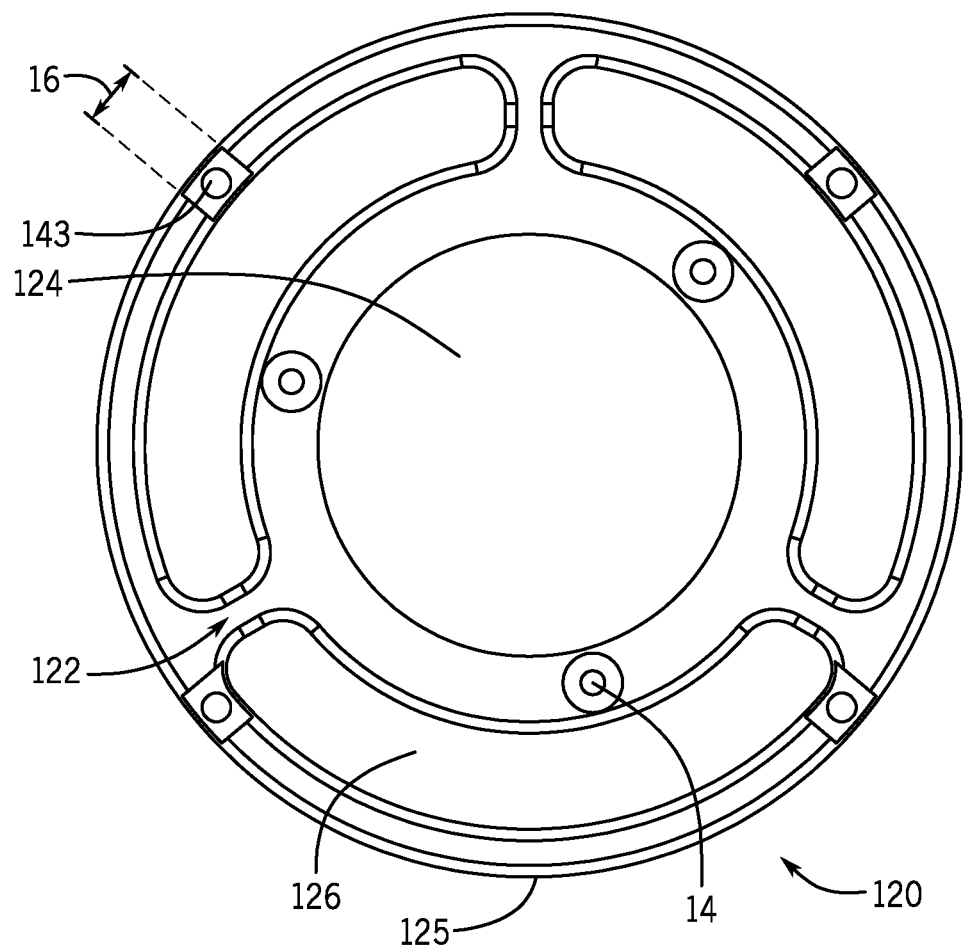
FIG. 10 is a front view of a spacer from FIG. 9.

In the embodiment shown, the first spacer 110 and second spacer 120 are rotorless. An exemplary second spacer 120 is also shown in FIG. 10, which shows a center opening 124 defined within a structure coupled by ribs 122 to the annual exterior 125. In this manner, an MKIII model (FIG. 6) may be upgraded to incorporate the improved features of the AT model (FIG. 3) while allowing the use of the existing top plate 41A.

It will be recognized that the first spacer 110 of certain configurations (FIG. 3) necessarily have a greater width 111 than the first spacer 110 in other configurations (FIG. 6). However, the internal space W2 and the width 71 of the type-B main module 70B are consistent in each of these configurations. Therefore, the present inventors have identified that further savings and/or reduction of inventory can be achieved by combining the first spacer 110 and the second spacer 120 of the configuration of FIG. 6 to together form the first spacer 110 in the configuration of FIG. 3. In this manner, only two widths of spacers are required across these various embodiments, rather than dedicated spacers for all three widths.

It should be recognized that the sensor 50 may, in certain embodiments, also have to be replaced to realize the full functionality of the upgrade from the configuration shown in FIG. 5 to that shown in FIG. 6.

Figure 7:
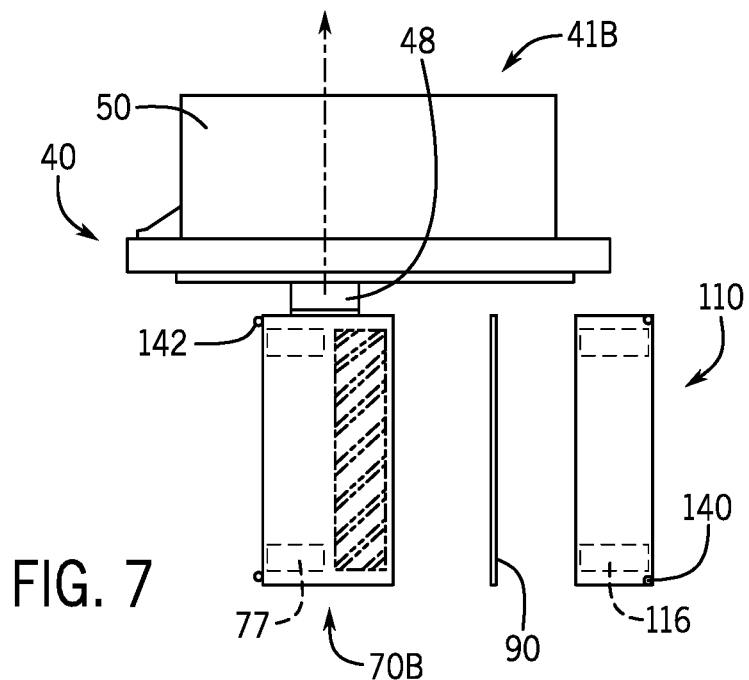
FIGS. 7 and 8 are partial, exploded side views of the devices shown in FIGS. 3 and 6, respectively.
Figure 8:
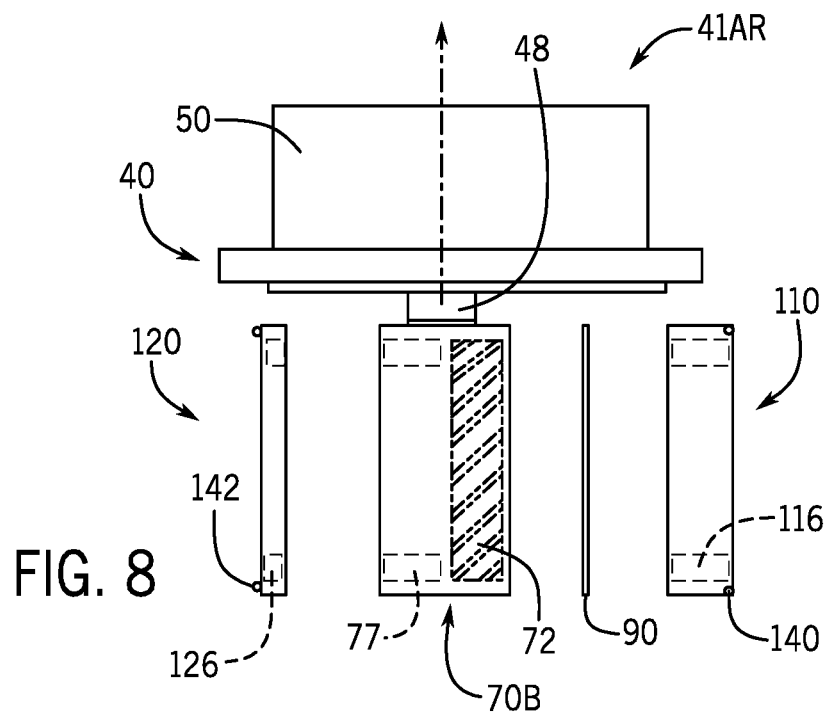
Figure 9:
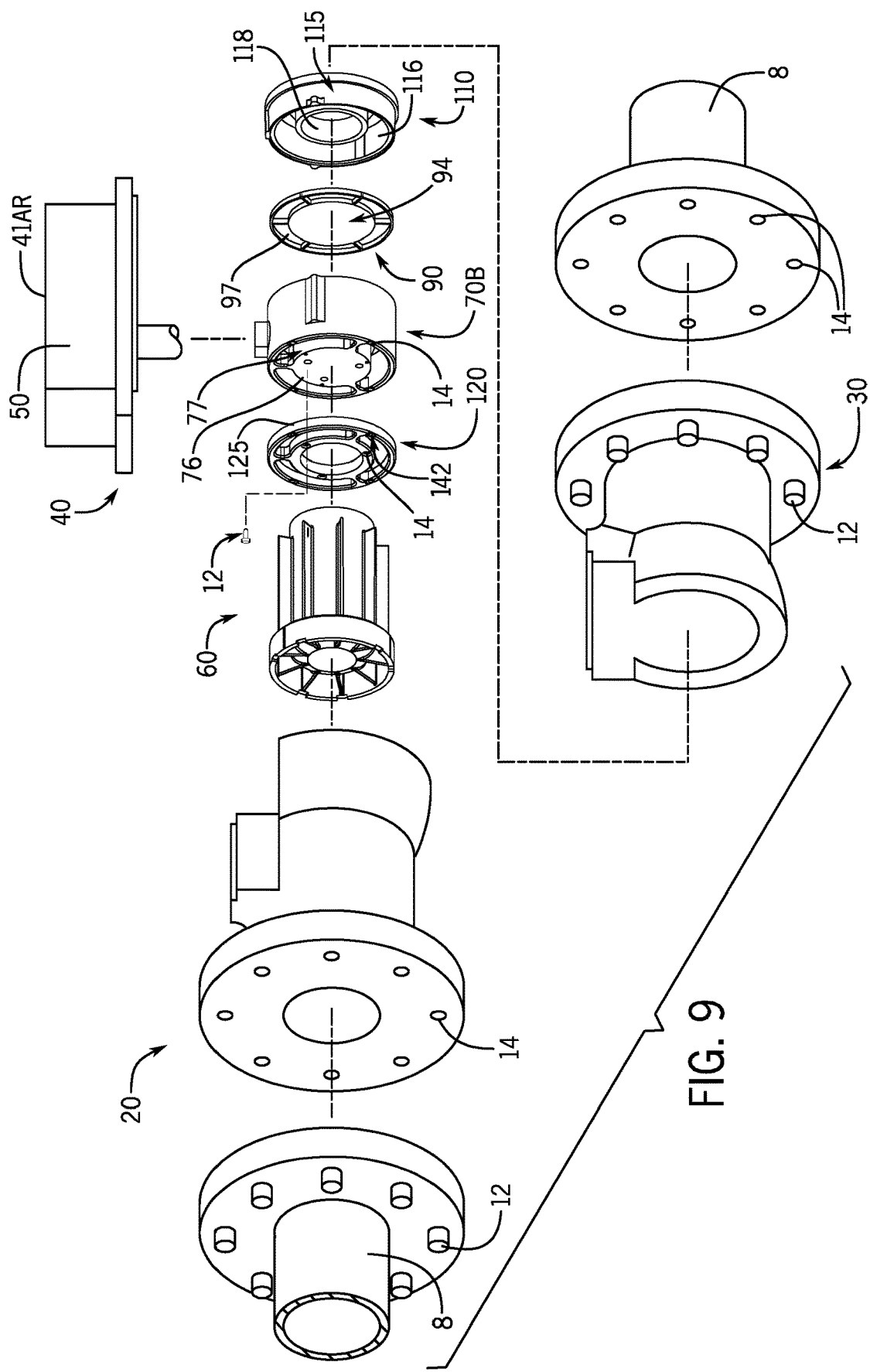
FIG. 9 depicts an exploded isometric view of one embodiment of a flow meter according to the present disclosure similar to that depicted in FIGS. 6 & 8.
Figure 11:
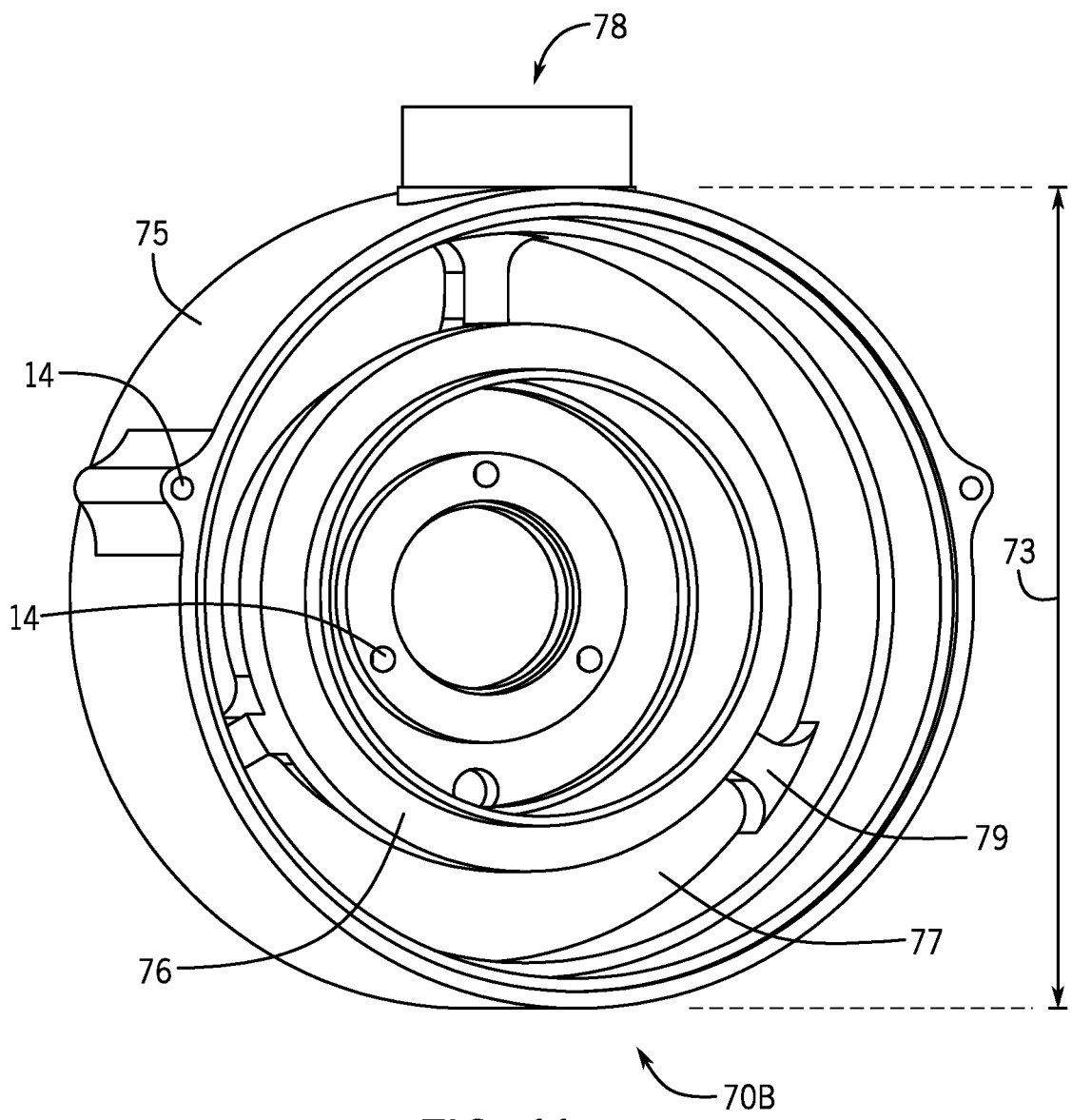
FIG. 11 is a rear view of the main module from FIG. 9.

FIGS. 7 and 8 further depict the newly developed flow meter systems 10 previously discussed (here, AT and MKIII models, respectively), each being upgradeable by incorporation of appropriately-sized and positioned spacers. In particular, the embodiment shown in FIG. 7 incorporates a first spacer 110, whereas the embodiment shown in FIG. 8 includes both a first spacer 110 and a second spacer 120. It should be recognized that while both embodiments discuss the use of a "first spacer," the first spacer 110 of the embodiment shown in FIG. 7 is, in certain embodiments, not the same as the first spacer 110 shown in FIG. 8. Additional views of the MKIII device are shown in FIGS. 9-13. The elements shown in FIGS. 11-12 are also used for AAT and AT models as well.

The embodiments shown in FIGS. 7 and 8 further disclose the incorporation of ball plungers 142, which ensure proper seating and alignment between components. The embodiment of FIG. 7 (the AT model), ball plungers 142 generate a spring force against the downstream end 24 of the inlet 20 (see FIG. 1) to properly position and energize the module-to-body seal ring 140. This is necessary to allow them to directly act against the inlet 20, and also to provide improved module sealing and proper alignment against surface 32 of the outlet 30. The same configuration is also used for the AAT model (FIG. 1). In the embodiment shown, the MKII model does not have provisions for ball plungers or the seal ring (FIG. 2).

These alignment features, along with fasteners 12 and corresponding openings 14 for receiving the fasteners 12 therethrough, provide alignment and/or coupling between the components discussed herein. In certain embodiments, such as that shown in FIG. 9 (with the rotor 72 removed for clarity), the openings 14 are defined within components for receiving fasteners 12, which may be threaded or through holes. The openings 14 are also shown to be counter-bored to accommodate for the head of the fasteners 12 to provide for flush coupling between elements. The embodiment shown further incorporates or defines holes 143 for receiving the ball plungers 142 previously discussed (see FIG. 10 and FIG. 7, for example). As with the openings 14, the holes 143 may be counter-bored, or be provided with a corresponding recess 16 to accommodate the head flange of a ball plunger 142, preventing it from interfering with flush installation between coupled components.

In addition to the flow meter systems 10 previously disclosed, the present disclosure further relates to a method of converting a flow meter system 10 from a first type having a type-A main module 70A to a second type having a type-B main module 70B. As previously discussed, certain embodiments also incorporate a secondary module 80. Each of the type-A main module 70A and type-B main module 70B (and where applicable, the secondary module 80) are configured to communicate fluid between an inlet 20 and an outlet 30, and also configured to detect the flow F of fluid therebetween, as previously discussed.

A top plate 40 is configured to be coupled between the inlet 20 and the outlet 30 in the customary manner. The method includes uncoupling the top plate 40, which when the flow meter system 10 is configured the first type has a short end 43 that is closer than a long end 45 to the outlet 30. The short end 43 is defined to be closer than the long end 45 to an opening 42 defined in the top plate 40, which is configured to receive an output shaft 48 as previously described. Next, the type-A main module 70A is removed from the flow meter system 10, wherein the type-A main module 70A includes a rotor configured to be rotated by the fluid flowing through the type-A main module 70A. The method includes coupling a first spacer 110 and a second spacer 120 (having a width 121) between the inlet 20 and the outlet 30, whereby the first spacer 110 and the second spacer 120 are separate and rotorless. The method further includes coupling the type-B main module 70B between the first spacer 110 and the second spacer 120, whereby the type-B main module 70B includes a rotor configured to be rotated by the fluid flowing through the type-B main module 70B. In certain embodiments, the center plate 90 is coupled between the type-B main module 70B and the first spacer 110. Finally, the method includes rotating and coupling the top plate 40 to the inlet 20 and outlet 30 such that the long end 45 of the top plate 40 is closer than the short end 43 to the outlet 30. In particular, this process may be used to convert an MKII device to a new MKIII device as presently disclosed, for example.

Similarly, the present disclosure includes a method of converting a flow meter system 10 from a first type having a type-B main module 70B to a second type also having a type-B main module 70B, in certain embodiments also including a secondary module 80. The type-B main module 70B, as well as the secondary module 80 when present, is configured to communicate fluid between an inlet 20 and an outlet 30. The type-B main module 70B has a rotor configured to be rotated by the flow of fluid and to consequently rotate an output shaft 48. The secondary module 80 also has a rotor and, in certain embodiments, provides error checking in the manner previously described.

The method includes removing a reversed first top plate 41AR coupled to the inlet 20 and the outlet 30, whereby the reversed first top plate 41AR has a short end 43 and a long end 45 and defines an opening 42 for receiving the output shaft 48 such that the short end 43 is closer than the long end 45 to the opening 42. The method includes removing the type-B main module 70B from the flow meter system 10, and removing a first spacer 110 and a second spacer 120, as shown in FIG. 6, that are each coupled between the inlet 20 and the outlet 30. In the present embodiment, both the first spacer and the second spacer are rotorless. The method includes re-coupling the type-B main module 70B between the inlet 20 and the outlet 30 with either a secondary module 80 or a first spacer 110 as shown in FIG. 3. Finally, the method includes coupling a second top plate 41B to the inlet 20 and the outlet 30, whereby the second top plate 41B has a short end 43 and a long end 45 and defines an opening 42 for receiving the output shaft 48 such that the second top plate 41B is coupled in a manner that the output shaft 48 of the type-B main module 70B aligns with the opening 42. This method may be used to convert an MKIII system as presently described to a full AAT system known in the art, or an AT system such as that shown in FIG. 3, for example.

It should be recognized that the presently disclosed systems and methods may also be used to develop further configurations not expressly discussed above. These may include different flow meter systems 10 that are convertible to have the same setup or features as presently known systems, or to further new flow meter systems 10. Likewise these may include the conversion of different presently known flow meter systems 10 to other presently known systems, or to other new flow meter systems 10 and/or functionality.

In the above description, certain terms have been used for brevity, clarity, and understanding. No unnecessary limitations are to be inferred therefrom beyond the requirement of the prior art because such terms are used for descriptive purposes and are intended to be broadly construed. The different assemblies described herein may be used alone or in combination with other devices. It is to be expected that various equivalents, alternatives and modifications are possible within the scope of any appended claims.

What is claimed is:

1. A flow meter system for detecting the flow of a fluid between an inlet and an outlet defining an internal space therebetween, a top plate being configured to be coupled to the inlet and the outlet, and a sensor being configured to detect the fluid flowing between the inlet and the outlet, the flow meter system comprising:

a main module configured to be coupled between the inlet and the outlet and to communicate the fluid therebetween, wherein the main module includes a main rotor configured to be rotated by the fluid flowing through the main module;

an output shaft configured to be coupled to the main rotor such that rotation of the main rotor causes rotation of the output shaft; and a first spacer configured to be removably coupled between the main module and the outlet and to communicate fluid therebetween, wherein the first spacer is rotorless;

wherein the top plate defines an opening configured to receive the output shaft from the main module, wherein the first spacer is configured to ensure alignment between the output shaft and the opening defined in the top plate, and wherein the sensor senses rotation of the output shaft to detect the flow of fluid.

2. The flow meter system according to claim 1, wherein the inlet and the outlet each have an upstream end and an downstream end, the internal space being defined between the downstream end of the inlet and the upstream end of the outlet, wherein a total width is defined between the upstream end of the inlet and the downstream end of the outlet, and wherein the total width is fixed.

3. The flow meter system according to claim 2, wherein a first width is defined between the downstream end of the inlet and the output shaft, and wherein the first width is nominally 1.5 inches.

4. The flow meter system according to claim 2, further comprising a center plate that is configured to be coupled between the main module and the first spacer and to communicate fluid therebetween.

5. The flow meter system according to claim 2, wherein the inlet defines an inlet diameter, the outlet defines an outlet diameter, and the first spacer defines a first spacer diameter, and wherein the first spacer diameter is at least as great as at least one of the inlet diameter and the outlet diameter.

6. The flow meter system according to claim 2, wherein a fluid flow direction is defined between the inlet and the outlet of the flow meter system, and wherein the output shaft is perpendicular to the fluid flow direction.

7. The flow meter system according to claim 2, wherein the flow meter system is upgradeable to incorporate a secondary module in place of the first spacer such that alignment between the output shaft and the opening defined in the top plate is unaffected.

8. The flow meter system according to claim 2, further comprising a second spacer configured to be coupled between the inlet and the outlet and to communicate the fluid therebetween, wherein the second spacer is rotorless.

9. The flow meter system according to claim 8, wherein the second spacer is installable both between the inlet and the main module and between the main module and the outlet.

10. The flow meter according to claim 2, wherein the top plate has a short end and a long end that is opposite the short end, the short end being closer than the long end to the opening, wherein the top plate is configured to be coupled to the inlet and the outlet both with the short end upstream of the long end and with the short end downstream of the long end.

11. The flow meter according to claim 10, further comprising a second spacer configured to be coupled between the inlet and the outlet and to communicate the fluid therebetween, wherein the second spacer is rotorless, wherein the opening is configured to be aligned with the output shaft only when the short end of the top plate is upstream of the long end.

12. A method of converting a flow meter system from a first type having a first main module to a second type having a second main module, each of the first main module and the second main module being configured to communicate fluid between an inlet and an outlet and also being configured to detect the flow of a fluid therebetween, a top plate being coupled between the inlet and outlet, the method comprising:

uncoupling the top plate, wherein when configured as the first type a short end of the top plate is closer than a long end to the outlet;

removing the first main module from the flow meter system, wherein the first main module includes a rotor configured to be rotated by the fluid flowing through the first main module;

coupling a first spacer and a second spacer between the inlet and the outlet, wherein the first spacer and the second spacer are each separate and rotorless;

coupling the second main module between the first spacer and the second spacer, wherein the second main module includes a rotor configured to be rotated by the fluid flowing through the second main module; and rotating and coupling the top plate to the inlet and the outlet such that the long end of the top plate is closer than the short end to the outlet.

13. The method according to claim 12, wherein each of the first main module and the second main module is configured to be coupled to an output shaft, wherein rotation of the rotor causes rotation of the output shaft, wherein the top plate defines an opening configured to receive the output shaft.

14. The method according to claim 13, wherein coupling the first spacer and the second spacer aligns the output shaft and the opening defined in the top plate only when the top plate is coupled such that the long end is closer than the short end to the outlet.

15. A method of converting a flow meter system from a first type having a first main module to a second type also having the first main module, the first main module being configured to communicate a fluid between an inlet and an outlet and having a rotor configured to be rotated by the flow of the fluid and to consequently rotate an output shaft, the method comprising:

removing a first top plate coupled to the inlet and the outlet;

removing the first main module from the flow meter system;

removing at least a first spacer coupled between the inlet and the outlet, wherein the first spacer is rotorless;

coupling the first main module between the inlet and the output and closer to the inlet than to the outlet; and one of: coupling the first top plate to the inlet and the outlet, and coupling a second top plate that is different than the first top plate to the inlet and the outlet.

16. The method according to claim 15, further comprising coupling a secondary module between the inlet and the outlet, wherein the secondary module has a secondary rotor.

17. The method according to claim 16, wherein the secondary module is downstream of the first main module, and wherein the secondary rotor of the secondary module has a different pitch than the rotor of the first main module.

18. The method according to claim 16, wherein when configured as the first type of flow meter system the first main module is coupled between the first spacer and a second spacer, and wherein a width of the secondary module is equal to the sum of a width of the first spacer and a width of the second spacer.

19. The method according to claim 16, wherein the first spacer has a width that is equal to a width of the secondary module.

20. The method according to claim 15, wherein an internal space is defined between the inlet and the outlet, and wherein the internal space is unchanged between the first type and the second type of the flow meter system.

* * * * *